United States Patent [19]
Shaffer et al.

[11] 3,869,271
[45] Mar. 4, 1975

[54] SHAPING GLASS SHEETS

[75] Inventors: Paul D. Shaffer, Tyrone; Vaughn R. Imler, Claysburg; Jack D. Morrissey, Tyrone, all of Pa.

[73] Assignee: PPG Industries, Inc., Pittsburgh, Pa.

[22] Filed: July 26, 1973

[21] Appl. No.: 383,021

[52] U.S. Cl..................... 65/273, 65/182 A, 65/275
[51] Int. Cl............................................ C03b 23/02
[58] Field of Search .......... 65/106, 273, 275, 182 A

[56] References Cited
UNITED STATES PATENTS 3,338,695  8/1967  Ritter, Jr............................ 65/106 X
3,468,645  9/1969  McMaster et al................. 65/273 X

*Primary Examiner*—Arthur D. Kellogg
*Attorney, Agent, or Firm*—Edward I. Mates; Thomas F. Shanahan

[57] ABSTRACT

Method and apparatus for shaping glass sheets, particularly those of non-rectangular outline into desired curvatures by the vacuum forming method.

12 Claims, 8 Drawing Figures

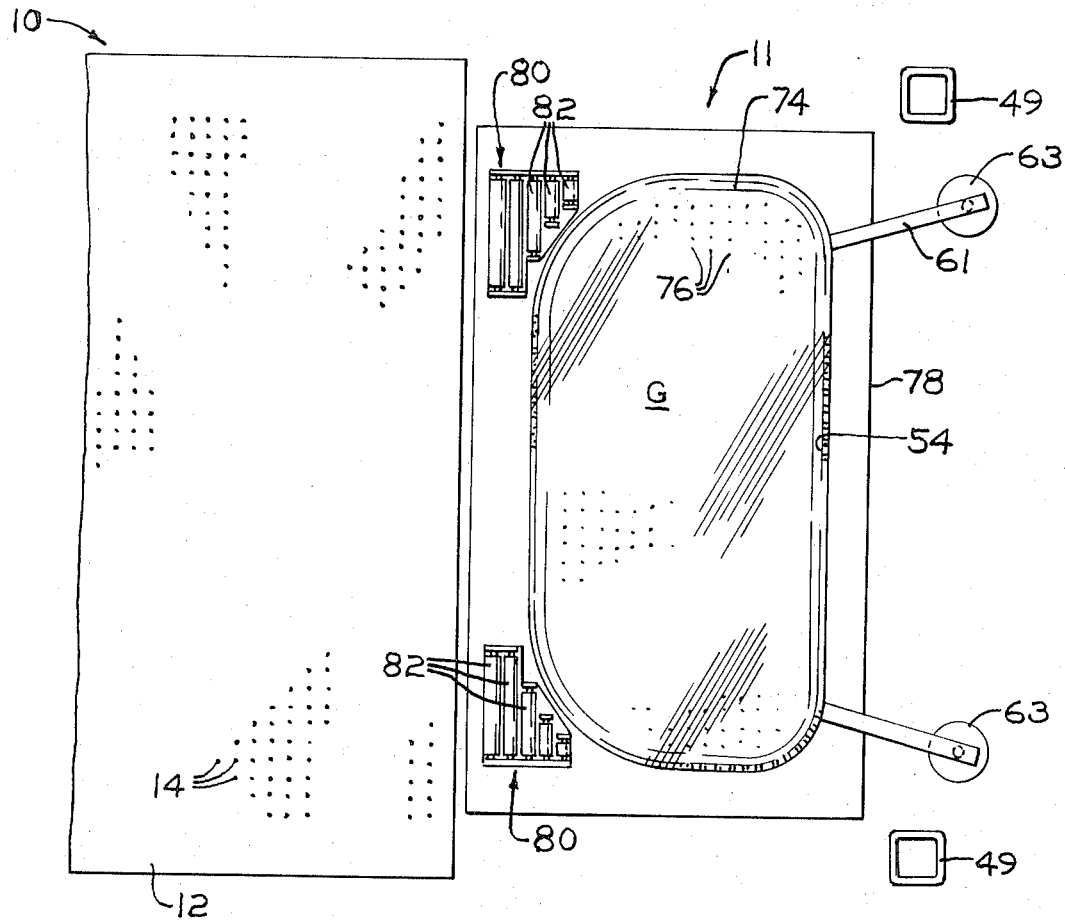
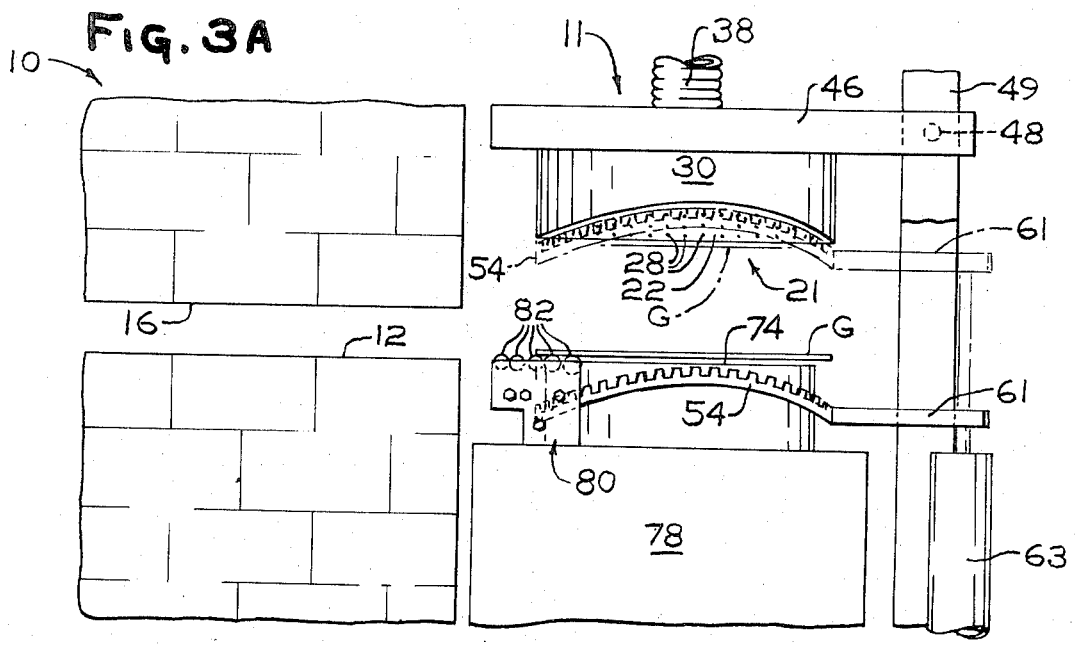

SHAPING GLASS SHEETS

BACKGROUND OF THE INVENTION

Vertically adjustable roller means located between the downstream edge of a first porous bed in a heating furnace and the upstream edge of a second porous bed in a bending station provides support for deformable glass sheets, while transferred therebetween, against sagging to the extent of contacting the porous bed in the bending station.

Glass sheets have been bent and tempered to form various configurations, particularly for automobile windows, such as rear-quarter windows for station wagons and windshields and backlights for various types of automobiles. In a gravity sag technique, a glass sheet is supported on a mold of outline configuration and heated to the glass deformation temperature until the glass conforms to the outline mold, and then the bent glass sheet is chilled rapidly while still supported on the outline mold. A typical mold used to fabricate rear quarter lights of station wagons that have a relatively flat main portion and a sharply curved end portion is shown in U.S. Pat. No. 3,220,821 to James S. Golightly. A typical mold and tempering apparatus for fabricating automobile backlights that have a main central portion of relatively gentle curvature merging into the longitudinal end portions of relatively sharp curvature is disclosed in U.S. Pat. No. 3,264,078 to George W. Stilley and James H. Cypher.

Gravity sag bending molds of the outline support type disclosed in the aforesaid Golightly and Stilley and Cypher patents produce glass sheets that conform quite closely to the desired curvature in the marginal portion. However, the intermediate part of the glass sheets so bent is characterized by uncontrolled sagging. Hence, the glass bending art turned to press bending to shape the glass sheet more exactly throughout its entire extent prior to the sudden chilling to eliminate undesired cross sagging.

In press bending, as depicted in U.S. Pat. No. 3,333,935 to Clement E. Valchar and Stanley J. Mrozinski and U.S. Pat. No. 3,512,953 to Michael P. Roseman, glass sheets are suspended vertically by tongs during their heating, shaping and cooling. Vertical orientation of heat-softened glass reduces its tendency to develop unwanted sag, but at the expense of introducing tong marks at the points of suspension. Hence, various techniques, such as the one disclosed in the aforesaid Roseman patent, have been developed to minimize the marking of the tongs on the glass sheets. Improved tong structures, such as those disclosed in U.S. Pat. No. 3,089,727 to William J. Hay, Jr., reduce the harmful effects of the tongs on the optical properties of the glass, but do not eliminate tong marks completely.

More recently, the glass shaping art has developed a concept of vacuum forming. The vacuum forming process does not require the use of tongs. Hence, tong marks are eliminated completely from glass sheets formed by the vacuum forming process.

Apparatus for vaccum forming hot glass sheets is disclosed in U.S. Pat. No. 3,468,645 to Harold A. McMaster et al. In this patent, glass sheets are heated in an enclosed furnace atmosphere to a deformation temperature while supported in a given support position on a layer of hot gas supplied through a first porous ceramic bed over which glass sheets travel. The bed extends beyond the enclosed furnace atmosphere in end to end relation with a second porous ceramic bed located at a shaping station. The latter incluces a ring-type mold that moves upward from a lowered position surrounding the upper surface portion of the second porous ceramic bed through which the gas layer is applied to an upward, glass sheet engaging position. The latter is in juxtaposition to an upper porous mold.

As the ring-type mold moves upward, it lifts the heat-softened glass into engagement with the upper porous mold having an enclosed chamber located directly thereabove. The hot glass is sandwiched in pressurized engagement between a downward facing shaping wall of the upper mold and the upward facing outline surface of the ring-type mold to impress the shape of the upper mold into the heat-softened glass sheet. The chamber behind the apertured upper mold is evacuated to insure that the glass sheet does not sag in its inner portion unsupported by the lower ring mold. A transfer carriage removes the bent glass from the ring mold and transfers the bent glass immediately to a cooling station. The ring mold is lowered into a position surrounding the second porous ceramic bed to await the arrival of the next glass sheet to be shaped.

This apparatus is limited in capability to bending glass sheets of substantially rectangular outline into configurations of substantially uniform shallow curvatures. The first and second porous ceramic beds have adjacent edges that are closely adjacent to one another so that the gas layer from the second porous ceramic bed forms a continuation of the gas layer from the first porous ceramic bed so that glass sheets of rectangular outline are continuously supported on one or the other gas layers or a combination thereof when they transfer from the first bed to the second bed.

However, when sheets of non-rectangular outline are treated, the outline of the second porous bed must conform to the outline of the lower ring mold. Consequently, portions of the second porous bed must be spaced from the edge of the first porous bed. When glass sheets of non-rectangular outline were transferred from the first porous ceramic bed to the second porous ceramic bed, they became hung up on the second porous ceramic bed and caused production stoppages.

SUMMARY OF THE INVENTION

The present invention particularly relates to improving the vacuum pressing technique of the aforesaid patented apparatus of McMaster et al to shape glass sheets of non-rectangular outlines as well as those of rectangular outlines. The present invention reduces and sometimes even eliminates the hanging up of a glass sheet on the second porous ceramic bed so that production can proceed with much less interruption to correct for "hang-ups."

According to the present invention, means is provided between the first porous ceramic bed within the furnace and the second porous ceramic bed at the shaping station outside the furnace to provide mechanical support for the glass sheets in the space between the first gas support bed in the enclosed furnace atmosphere to the second gas support bed at the shaping station.

The present invention is especially suitable for producing so-called J-bends, which are used as the rear quarter windows of station wagons where the sharply bent region is disposed adjacent one longitudinal end of the shaped sheets. The present invention is also suitable for use in making tempered backlights for automobiles which have sharply bent end portions at each longitudinal extremity thereof.

DESCRIPTION OF THE PRIOR ART

U.S. Pat. Nos. 3,468,645 and 3,713,799 to Harold A. McMaster et al., disclose a vacuum forming apparatus comprising a first porous ceramic bed and a shaping station beyond said first porous ceramic bed. The shaping station comprises an upper apertured mold having a downward facing shaping wall of convex configuration and a lower ring-type mold adapted to surround a second porous ceramic bed disposed below the upper apertured mold. The lower ring mold is shaped according to the outline of the glass sheets undergoing shaping and is raised from its position surrounding the second porous ceramic bed to lift a glass sheet into engagement with the upper mold. Vacuum may be applied to the upper mold to urge the surface of the glass sheet against the convex upper mold as it is being curved to conform the glass sheet to the shape of the molds.

The first porous ceramic bed in the apparatus of said patents is adjacent the second porous ceramic bed. Thus, it is easy to transfer glass sheets whose outlines have rectangular configurations from one ceramic bed to another. However, "hang-ups" of glass sheets were experienced on the second porous ceramic bed when attempts were made to shape glass sheets of non-rectangular outline on said vacuum forming apparatus.

The present invention will be understood more readily in the light of the description of a preferred illustrative embodiment that follows.

DESCRIPTION OF THE DRAWINGS

In the drawings that form part of the description of preferred embodiments of the present invention, wherein like reference characters are applied to like structural elements.

FIGS. 3A and 3B are views similar to FIGS. 1A and 1B, showing a later stage of the glass sheet shaping operation.

DESCRIPTION OF THE PREFERRED EMBODIMENT

Figure 1B:
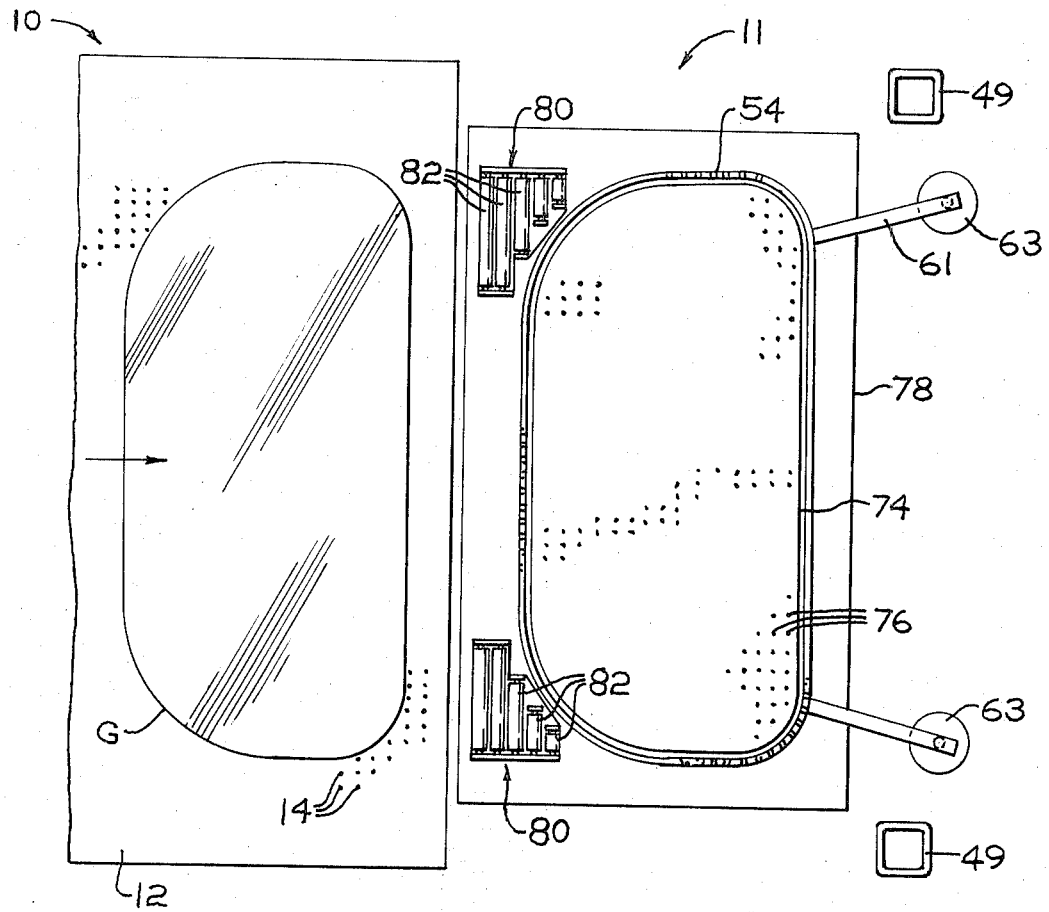
FIGS. 1A and 1B are an elevational end and plan view, respectively, of vacuum forming apparatus modified according to the present invention showing one stage of a glass sheet shaping operation.

Referring to the drawings, apparatus constructed according to the present invention comprises an elongated, tunnel type furnace 10 and a shaping station 11 disposed in end-to-end relation. The furnace 10 encloses a first porous ceramic bed 12 extending along the floor thereof. Heated gas is applied under pressure through apertures 14 of the first porous ceramic bed 12 to provide a hot gaseous blanket for supporting and heating a series of glass sheets G conveyed through the furnace 10. The furnace roof 16 supports a series of radiant heating elements that irradiate the upper surface of said series of glass sheets.

The shaping station 11 comprises an upper vacuum mold 21 having a downwardly facing curved shaping wall 22. The different portions of the shaping wall are provided with shapes that conform to the shape to be applied to different regions of a heat-softend glass sheet engaged thereby during a shaping operation.

Apertures 28 are provided throughout the extent of the upper mold 21 to provide air passages through the thickness of the wall 22 into a vacuum chamber 30 disposed above the apertured shaping wall 22. The vacuum chamber is apertured at its upper wall to receive a vacuum supply hose 38 that extends to a vacuum pump (not shown). When the vacuum pump is operated, air is exhausted through the apertures 28 and the vacuum chamber 30 to suck a heat-softened glass sheet into conformity with the lower surface of the curved shaping wall 22.

The vacuum mold 21 is connected to a reinforcing frame structure 46. The latter is pivoted about pivots 48 to a support structure 49. The apparatus depicted thus far is usually used in combination with a ring-type lower mold shown generally at 54 disposed below the position occupied by said vacuum mold 21. The ring-type mold may comprise a unitary outline ring whose upper edge conforms in elevation and outline to the configuration desired for the bent glass sheet or, as an alternative structure, may be constructed of jointed sections arranged in a well known, end-to-end relation and pivoted to one another, for example, so as to comprise a main mold section of relatively shallow curvature and sharply bent end sections pivotally connected in end-to-end relation to the main mold section.

The lower ring-type mold 54 comprises a pair of longitudinal extending shaping rails, each having a serrated upper edge surface defining the curvature conforming to that to be imparted to the bent glass sheet along its longitudinal side edges, and end section shaping rails interconnecting the ends of the longitudinal rails and conforming generally to the outline of the end region of the bent glass sheet. The longitudinal extending shaping rail adjacent the furnace 10, may be designated as the trailing longitudinal edge of the shaping ring mold or ring-type mold 54, and the opposing longitudinal extending rail as the leading longitudinal edge thereof. The rails are also provided with notches (not shown) to permit retractable fingers of a transfer carriage to lift the bent glass sheet off the mold for further processing in a manner well known in the art.

The lower, ring-type mold 54 is rigidly connected to a vertically displaceable frame-type support 61. A pair of simultaneously actuated vertical actuating means such as pistons 63 or chain drives is connected to the frame type support 61. The vertical pistons 63 actuate the raising and lowering of the frame-type support 61 and its attached ring-type mold 54.

A second porous bed 74 of ceramic material is located below the upper vacuum mold 21 and in the plane occupied by the first bed 12. Bed 74 has an outline conforming to the shape of the lower ring-type mold 54 in its upper portion for receiving said ring-type mold 54 therearound. The ceramic bed is porous by virtue of apertures 76 and is superimposed over a gas supply chamber 78 through a series of communicating passageways. The ceramic bed 74 forms an extension of the first porous gas bed 12 over which glass sheets are conveyed through furnace 10 while being heated to the glass deformation temperature.

Both porous ceramic beds 12 and 74 are composed of a fused silica composition having a low coefficient of thermal expansion. A suitable material is sold commercially under the trademark MASROCK.

Figure 1A:
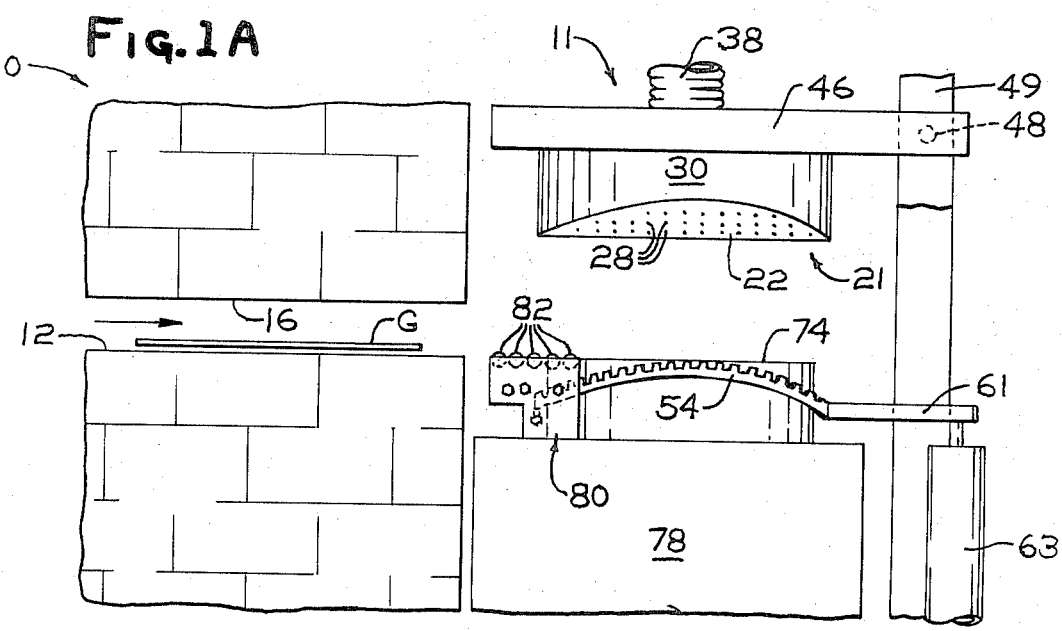

In order to appreciate the importance of the present invention, a typical glass sheet bending operation will be described. In FIGS. 1A and 1B, a glass sheet G is shown near the exit of furnace 10, where it has been heated to an elevated temperature sufficient for deformation to its desired shape conforming to that of the downwardly facing shaping wall 22 of the upper vacuum mold 21 and the upwardly facing outline surface of the lower ring-type mold 54. Note that the downstream edge of the first porous ceramic bed 12 terminates in a straight line at the exit of the furnace 10, whereas the upstream edge of second porous ceramic bed 74 has a curved line conforming to the outline of the lower ring-type mold 54. This arrangement requires the lateral edge portions of the glass sheet to traverse a distance unsupported by gaseous support long enough to permit the glass portions to sag below the general plane of gaseous support provided by the first porous ceramic bed 12 and the second porous ceramic bed 74.

Figure 2B:
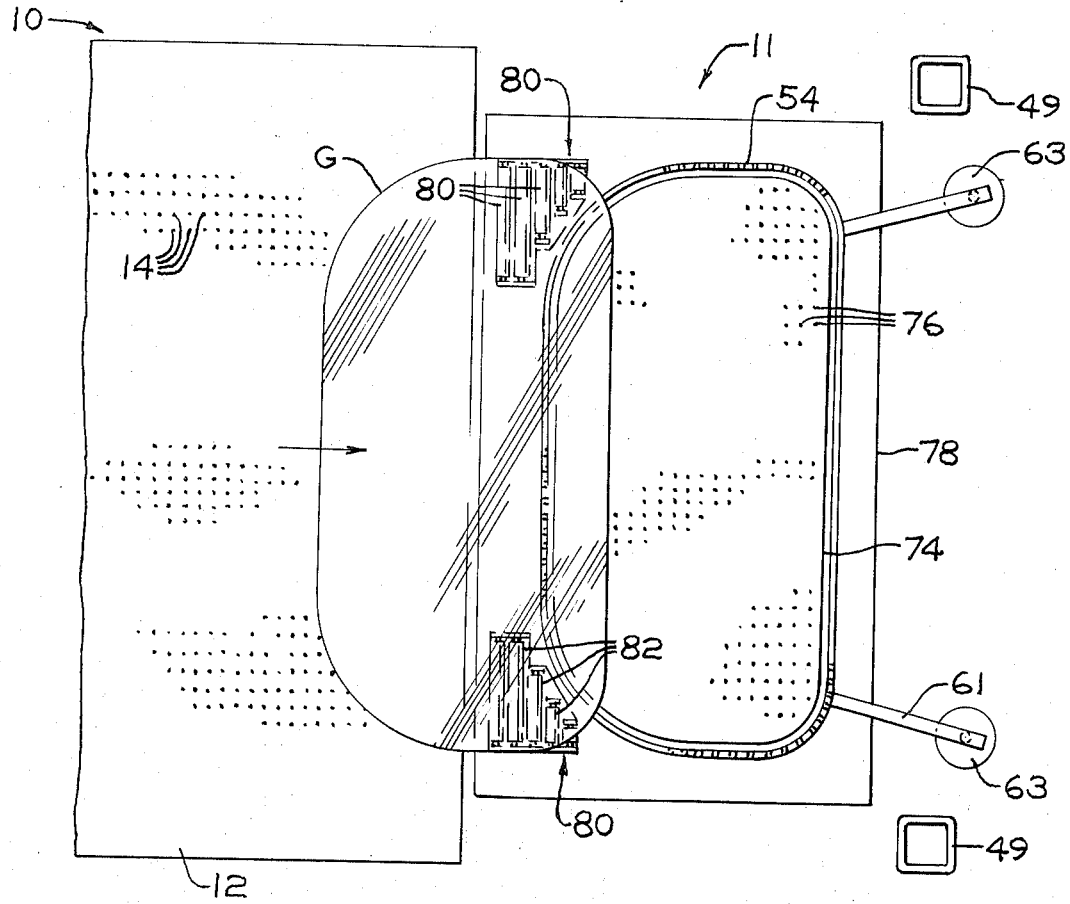
FIGS. 2A and 2B are views similar to FIGS. 1A and 1B, showing an intermediate stage of a glass sheet shaping operation.
Figure 2A:
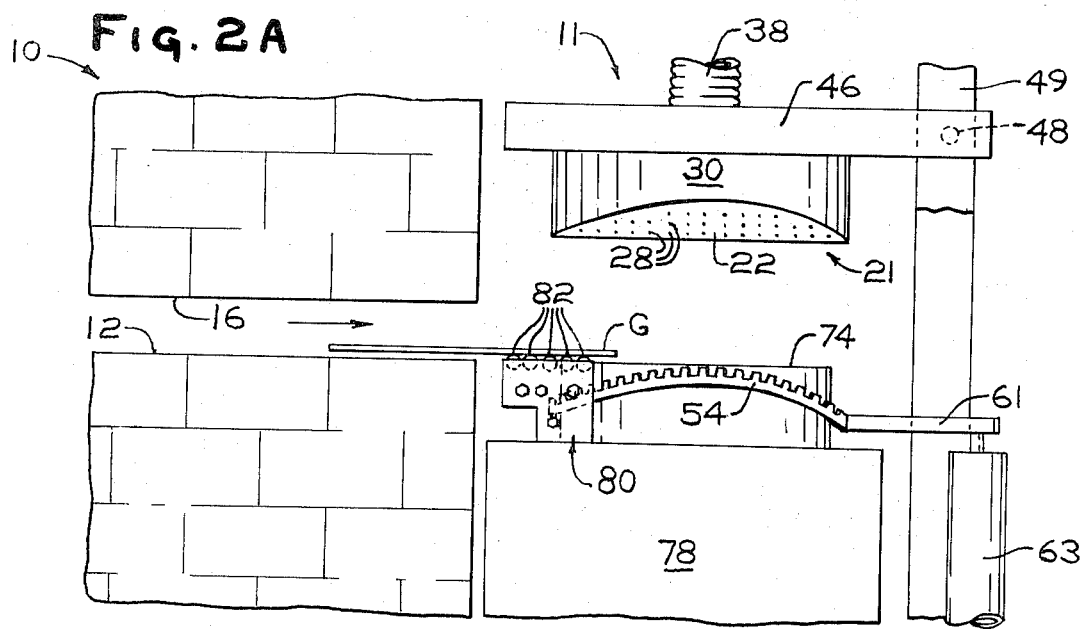
Figure 4:
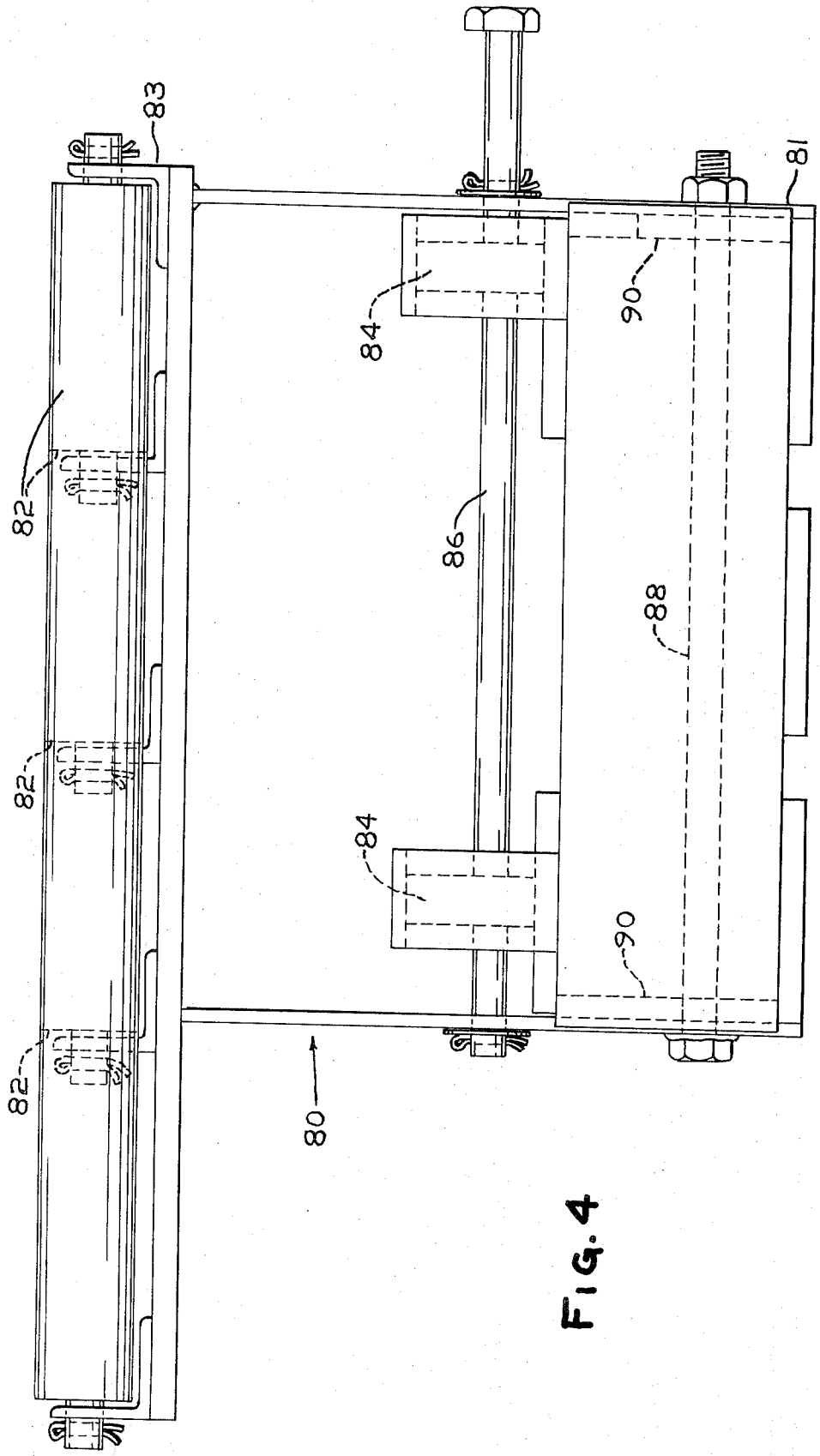
FIGS. 4 and 5 are mutually perpendicular, enlarged end views of an important structure forming part of the present invention, with parts omitted to show other parts clearly.
Figure 5:
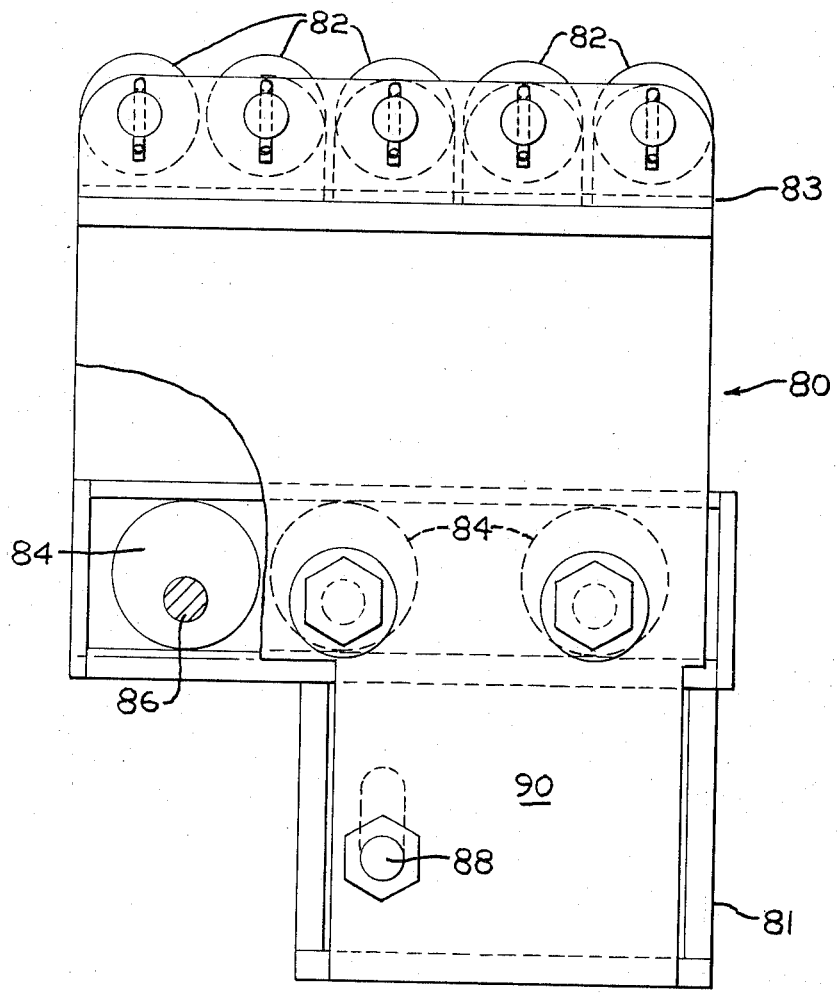

FIGS. 2A and 2B show the position occupied by a glass sheet G as the glass sheet is being transferred from a position in the furnace 10 depicted in FIGS. 1A and 1B to a position at the shaping station 11 depicted in FIGS. 3A and 3B. When the glass sheets to be shaped have a rectangular outline, the upstream edge of the second porous ceramic bed 74 may be closely spaced to the downstream edge of the first porous ceramic bed 12 so that the entire dimension of the glass sheet G transverse to the direction of movement travels a short unsupported distance between the gaseous flows from apertures 14 of the first porous bed 12 and from apertures 76 of the second porous bed 74. However, when the glass sheet is non-rectangular in outline, it is necessary for the lower ring-type mold 54 to have a conforming shape and it is necessary for the second porous bed 74 to have a corresponding outline that allows the ring-type mold 54 to nest in surrounding relation to provide clearance for entry of a glass sheet into the shaping station. Unfortunately, such a shape requires spacing between a portion of the second porous ceramic bed 74 and the downstream edge of the first porous ceramic bed 12. Spaces extend between both lateral edges of the beds.

A look at the plan views of FIGS. 1B, 2B and 3B reveals that the outline of the second porous bed 74 is similar to that of the lower ring-type mold 54 to receive the lower ring-type mold 54 in a recessed position permitting a glass sheet G to arrive in position of alignment over the second porous bed 74 and be lifted by the lower ring-type mold 54 upward into engagement with the downwardly facing curved shaping wall 22 of the upper vacuum mold 21. When the outline of the glass sheets undergoing shaping departs considerably from a rectangular shape, for example, when the outline has rounded portions, the unsupported length of glass sheet traversing the space between the upstream edge of the first porous bed 12 and the downstream edge of the second porous bed 74 becomes too long to prevent the portions of the heat-softened glass sheet from sagging sufficiently to become hung up on the upper surface of the second porous bed 74. Such hang-ups stop production and cause the loss of valuable glass sheets.

The present invention provides means to prevent stoppages of production of glass sheets due to the aforesaid hang-ups. The means according to the present invention comprises vertically adjustable bracket means 80 mounted on a base member 81 and supporting a series of freely rotatable stub rolls 82 at its upper end 83. A series of cam means 84 is provided on alternating sides to adjust the vertical position and orientation of the upper portion of the rolls 82 so that their common tangent lies approximately in the plane occupied by the upper surfaces of the first porous bed 12 and the second porous bed 74. Preferably, each successive cam means 84 comprises an eccentric cam connected to an alternate end of a successive cam shaft 86 disposed below the rolls 82 and above an adjustment shaft 88 interconnecting lower slotted wall portions 90 to the base member 81 supporting the vertically adjustable bracket means 80. Each cam means 84 is individually adjustable to control the orientation of the common tangent.

The rolls 82 are chosen of a size and spacing that fills the gap between the downstream edge of the first porous bed 12 and the upstream edge of the second porous bed 74. In the illustrative embodiment, a series of five rolls of one-inch diameter is spaced 1 1/16 inch apart center to center and includes two rolls 12 inches long and one roll each of 8, 4 and 2 inches length. It is understood that the size and arrangement of rolls may vary as needed to give rolling support in the space or spaces extending between porous beds 12 and 74 where sufficient gaseous support is absent.

When the vertical position of the bracket means 80 is adjusted properly so that the stub rolls 82 have their upper portions in a common tangential plane at approximately the level of beds 12 and 74, the glass sheet portions that would sag during transfer of the glass sheet from the furnace 10 to the shaping station 11 in the absence of the bracket means 80 are provided with rotating support from stub rolls 82 so that when the rotatably supported glass sheet portions arrive at the second porous bed 74 at the shaping station 11, they are free to float over said second porous bed 74 and be engaged and lifted by the lower ring-type mold 54 into engagement with the downwardly facing shaping wall 22 of the upper vacuum mold 21. Hang-ups are avoided and the glass is processed without interruption.

The composition of the stub rolls 82 is very important to insure that there is a minimum of glass marking or glass breakage in case the glass sheets come into contact with the rolls during their transit from the furnace 10 to the shaping station 11. The material of the rolls must have low thermal conductivity to minimize thermal shock in case the temperature of the rolls is considerably cooler than that of the glass sheets. The rolls must be of a composition that does not react chemically with glass at elevated temperatures, that is durable over a wide range of temperatures and preferably has a low coefficient of thermal expansion over a wide temperature range. A suitable material is an alumina-silica refractory composition, such as an asbestos cement sold by Johns Manville under the trademark of TRANSITE.

In FIGS. 3A and 3B, a glass sheet G is shown in solid lines in position above the ceramic bed 74. The vacuum mold 21 is disposed over the glass sheet with the vacuum supply hose 38 open, and the open ring-type mold 54 is located around the ceramic bed 74. In phantom, the vertical pistons 63 have actuated vertical movement upward of the frame-type support 61 and the ring-type mold 54.

The vacuum mold 21 is in contact with the entire upper surface of the glass sheet, vacuum is being applied through vacuum chamber 30 and the apertures 28 in the downwardly facing shaping wall 22. The ring-type mold 54 engages the peripheral portion of the under surface of the glass sheet G a small fraction of an inch inside the glass edge.

After the shape is impressed on the glass sheet in the manner described above, the glass rests on the closed ring-type mold 54 while the modified vacuum mold 21 is pivoted upward about pivots 48 out of engagement with the upper surface of the glass sheet G. The bent glass sheet is removed from contact with mold 21 and supported momentarily on the outline mold 54. The glass sheet is then removed from the mold 54 by fingers of a carriage (not shown) and transferred to a cooling station where it is rapidly chilled to impart at least a partial temper to the glass.

The usual limit switches and interlocks are used to control the operation of timer circuits in a manner well known in the art. The particular electrical control circuitry forms no part of the present invention.

In a particular embodiment of the present invention, the shaping wall 22 suitable for shaping glass sheets up to thicknesses of a quarter inch comprises a quarter inch thick perforated plate of hot rolled steel. The vacuum mold 21 is provided with a cover in direct contact with the shaping surface. The cover is preferably of a material that does not harm glass at elevated temperatures, for example, a stretchable knit fabric of glass cloth composed of texturized yarn such as depicted in U.S. Pat. No. 3,148,968 to James H. Cypher and Clement E. Valchar. The cover is clamped in an unwrinkled condition against the downward facing shaping wall 22 in a manner well known in the art.

The form of the invention shown and described in this disclosure represents an illustrative preferred embodiment and a modification thereof. It is understood that various changes may be made without departing from the spirit of the invention as recited in the claimed subject matter that follows.

We claim:

1. In an apparatus for conveying and shaping glass sheets along a horizontal path of movement, comprising an elongated heating furnace and a shaping station disposed in end-to-end relation, an outline shaping ring mold disposed in said shaping station, a first porous bed within said heating furnace providing gas for supporting glass sheets in floating relation thereover during movement therethrough, a second porous bed within said shaping ring mold providing gas for supporting one of said glass sheets at a time in floating relation thereover, said shaping ring mold having a trailing longitudinal edge and a leading longitudinal edge, at least one terminal portion of said trailing longitudinal edge being disposed so that a substantial space exists between said portion of said trailing edge and said first porous bed, and roller means rotatably supported in said space so as to contact and support a portion of the glass sheet that sags below its horizontal path of movement.

2. The apparatus of claim 1 having means to adjust the vertical position of said roller means.

3. The apparatus of claim 2, wherein said vertically adjustable roller means comprises a series of stub rolls rotatably supported at the upper portion of movable bracket means.

4. The apparatus of claim 3, wherein a plurality of adjustable cam means is operatively connected to said movable bracket means to adjust the position and orientation of said bracket means.

5. The apparatus of claim 4, wherein said vertically adjustable roller means of said movable bracket means comprises a plurality of stub rolls, at least one of said stub rolls having a different axial length than another of said stub rolls.

6. The apparatus of claim 1, wherein said second porous bed has a non-rectangular outline conforming to the outline of said glass sheets undergoing shaping and said shaping station comprises an upper mold having a downwardly facing curved shaping wall and a lower shaping ring mold conforming to said outline and movable between a lowered position surrounding said second porous bed and a raised position in juxtaposition to said upper mold.

7. The apparatus of claim 1, wherein said roller means is free running.

8. The apparatus of claim 1, wherein said space extends between a lateral edge portion of said first bed and a corresponding lateral edge portion of said second bed and said roller means is located in said space.

9. The apparatus of claim 8, further including a second space extending between a lateral edge portion of said first bed opposite said first named lateral edge portion and a corresponding lateral edge portion of said second bed and additional roller means is located in said second space.

10. The apparatus of claim 9, wherein said roller means and said additional roller means are free running.

11. In an apparatus for conveying and shaping glass sheets along a horizontal path of movement, comprising an elongated heating furnace and a shaping station disposed in end-to-end relation, an outline shaping ring mold disposed in said shaping station, a first porous bed within said heating furnace providing gas for supporting glass sheets in floating relation thereover during movement therethrough, a second porous bed within said shaping ring mold providing gas for supporting one of said glass sheets at a time in floating relation thereover, said shaping ring mold having a trailing longitudinal edge and a leading longitudinal edge, at least one terminal portion of said trailing longitudinal edge being disposed so as to provide a non-rectangular shaping ring of an outline shape such that a substantial space exists between said portion of said trailing edge and said first porous bed, and roller means rotatably supported in said space so as to contact and support a portion of the glass sheet that sags below its horizontal path of movement.

12. The apparatus of claim 11, having means to adjust the vertical position of said roller means.

* * * * *